(12) United States Patent
Luo et al.

(10) Patent No.: US 10,279,432 B2
(45) Date of Patent: May 7, 2019

(54) DEVICE AND METHOD FOR LASER CUTTING OF ALUMINUM ALLOY WHEEL BLANK BURRS

(71) Applicant: CITIC Dicastal CO., LTD, Qinhuangdao (CN)

(72) Inventors: Fengbao Luo, Qinhuangdao (CN); Ruixiao Zhou, Qinhuangdao (CN); Chuan Dai, Qinhuangdao (CN); Dengyao Li, Qinhuangdao (CN); Xiao Liu, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 221 days.

(21) Appl. No.: 15/337,534

(22) Filed: Oct. 28, 2016

(65) Prior Publication Data

US 2017/0120388 A1    May 4, 2017

(30) Foreign Application Priority Data

Oct. 30, 2015    (CN) .......................... 2015 1 0726945

(51) Int. Cl.
| | | |
|---|---|---|
| *B23K 26/361* | (2014.01) | |
| *B21D 53/26* | (2006.01) | |
| *B23K 26/02* | (2014.01) | |
| *B23K 26/08* | (2014.01) | |
| *B23K 26/03* | (2006.01) | |

(Continued)

(52) U.S. Cl.
CPC .......... *B23K 26/361* (2015.10); *B21D 53/264* (2013.01); *B23K 26/02* (2013.01); *B23K 26/03* (2013.01); *B23K 26/0604* (2013.01); *B23K 26/0823* (2013.01); *B23K 26/0838* (2013.01); *B23K 26/0869* (2013.01); *B23K 26/40* (2013.01); *B23K 2101/006* (2018.08); *B23K 2101/06* (2018.08); *B23K 2103/10* (2018.08)

(58) Field of Classification Search
CPC ...... B23K 26/361; B23K 26/02; B23K 26/03; B23K 26/0604; B23K 26/0823; B23K 26/0838; B23K 26/0869; B23K 26/40; B23K 2103/10; B23K 2101/06; B23K 2101/006; B21D 53/264
USPC ............ 219/121.67, 121.72, 121.76, 121.78, 219/121.82
See application file for complete search history.

(56) References Cited

U.S. PATENT DOCUMENTS

| | | | | |
|---|---|---|---|---|
| 4,623,229 A | * | 11/1986 | Galan .................... | B23K 26/02 219/121.63 |
| 4,760,583 A | * | 7/1988 | Sasnett .................. | B23K 26/02 372/107 |

(Continued)

*Primary Examiner* — Jimmy Chou
(74) *Attorney, Agent, or Firm* — Howard IP Law, PLLC; Jeremy Howard

(57) ABSTRACT

The present invention provides a device and method for laser cutting of aluminum alloy wheel blank burrs. The device includes a wheel hub lifting and locking mechanism and one or more groups of lasers mounted to a moving mechanism, and the moving mechanism comprises vertical guide columns (8) and horizontal guide columns (10) mounted to the vertical guide columns (8). During use, the device of the present invention can realize the function of online cutting of wheel burrs, thereby improving work efficiency and reducing manual labor, and the device has the characteristics of high cutting precision, rounded and burr-free cutting parts, stable performances, high degree of automation and the like.

2 Claims, 3 Drawing Sheets

(51) Int. Cl.
*B23K 26/06* (2014.01)
*B23K 26/40* (2014.01)
B23K 101/00 (2006.01)
B23K 101/06 (2006.01)
B23K 103/10 (2006.01)

(56) References Cited

U.S. PATENT DOCUMENTS

| | | | | |
|---|---|---|---|---|
| 5,225,650 | A * | 7/1993 | Babel | B23K 26/0823 |
| | | | | 219/121.69 |
| 5,314,288 | A * | 5/1994 | Schmidt | B62D 43/045 |
| | | | | 254/323 |
| 6,539,830 | B1 * | 4/2003 | Koskovich | B23D 59/001 |
| | | | | 144/245.2 |
| 6,706,999 | B1 * | 3/2004 | Barrett | B23K 26/02 |
| | | | | 219/121.74 |
| 9,000,321 | B2 * | 4/2015 | Yamaguchi | B23K 7/002 |
| | | | | 219/121.58 |
| 2002/0144987 | A1 * | 10/2002 | Tomlinson | B23K 26/02 |
| | | | | 219/121.74 |
| 2003/0080096 | A1 * | 5/2003 | Yamaguchi | B23K 37/0461 |
| | | | | 219/121.39 |
| 2003/0102293 | A1 * | 6/2003 | Therond | B23K 26/0643 |
| | | | | 219/121.78 |
| 2004/0104203 | A1 * | 6/2004 | Yamaguchi | B23K 5/22 |
| | | | | 219/121.36 |
| 2009/0245945 | A1 * | 10/2009 | Ostendarp | B23K 26/0823 |
| | | | | 407/30 |
| 2011/0062127 | A1 * | 3/2011 | Gu | B23K 26/04 |
| | | | | 219/121.69 |
| 2011/0089148 | A1 * | 4/2011 | Mootz | B23K 26/0838 |
| | | | | 219/121.63 |
| 2013/0193122 | A1 * | 8/2013 | Nomaru | H01L 21/76898 |
| | | | | 219/121.62 |
| 2013/0193125 | A1 * | 8/2013 | Nishiyama | B23K 26/0823 |
| | | | | 219/121.85 |
| 2015/0001195 | A1 * | 1/2015 | Okada | B23K 26/08 |
| | | | | 219/121.67 |
| 2015/0158124 | A1 * | 6/2015 | Kino | G02B 6/44 |
| | | | | 219/121.78 |
| 2017/0189998 | A1 * | 7/2017 | Luo | B23K 37/0426 |

* cited by examiner

DEVICE AND METHOD FOR LASER CUTTING OF ALUMINUM ALLOY WHEEL BLANK BURRS

This application claims priority from CN 201510726945.6, filed on Oct. 30, 2015, the entire content of which is incorporated herein by reference.

TECHNICAL FIELD

The invention relates to the machining field, and in particular to a device and method for laser cutting of aluminum alloy wheel blank burrs.

BACKGROUND ART

At present, during a process of casting production of a low-pressure aluminum alloy wheel, it is inevitable that large burrs are formed at upper and lower parting line positions of the cast blank of this aluminum alloy wheel due to the parting of casting dies. These burrs must be cut off, otherwise great impacts are brought upon subsequent machining procedures, leading to a decrease in machining efficiency and accelerating the wear of machine tools and cutting tools. The traditional way to cope with these burrs is to cut them off by an operator with a cutter after the blank part is cast and hardened. This greatly increases the labor intensity of the operator and also brings an adverse effect on mechanical automation in production. Also, during the cutting process, the wheel appearance surface is prone to be worn, resulting in rejection of the wheel cast parts.

SUMMARY OF THE INVENTION

In order to overcome the above problems in the prior art, an object of the present invention is to provide a laser burr-cutting device for online cutting of burrs generated during the casting process, which greatly saves machining costs, improves machining precision and ensures the quality of products.

In one aspect of the present invention, a device for laser cutting of aluminum alloy wheel blank burrs is provided. The device comprises a wheel hub lifting and locking mechanism and one or more groups of lasers mounted to a moving mechanism, and the moving mechanism comprises vertical guide columns (8) and horizontal guide columns (10) mounted to the vertical guide columns (8).

In a preferred aspect of the present invention, the lasers of the device are configured at one or more of the following positions: a wheel center position of a wheel hub to be machined, an outer wheel lip position of the wheel hub to be machined and an inner wheel lip position of the wheel hub to be machined.

In a preferred aspect of the present invention, the device consists of a frame (1), a bottom hydraulic cylinder (2), a support plate (3), a side locking slider (4), a wheel rim inner wall high-temperature-resistant resin gasket (5), rotating hydraulic motor-and-pinion units (6), a gear wheel (7), vertical guide columns (8), laser heads (9), horizontal guide columns (10), a top hydraulic cylinder (11), a discharge tray (13), a connection disc (14), a flange inner high-temperature-resistant resin gasket (15), a top locking slider (16), a middle ejection hydraulic cylinder (17), a roller way (18), side locking hydraulic cylinders (19), upright guide plates (20), a bottom guide column (21), and grating sensors (22), and the device is characterized in that: the bottom hydraulic cylinder (2) and the bottom guide column (21) are fixed above the frame (1); the hydraulic cylinder piston rod of the bottom hydraulic cylinder (2) is connected with the support plate (3), four side locking hydraulic cylinders (19) are uniformly and circumferentially distributed above the support plate (3), the pistons of the locking hydraulic cylinders (19) are connected with the side locking slider (4), and the upright guide plates (20) are mounted on the two sides of the side locking slider (4); the wheel rim inner wall high-temperature-resistant resin gasket (5) is mounted on the side locking slider (4) and arranged to be in contact with the inner cavity of a wheel rim when locking; the middle ejection hydraulic cylinder (17) is mounted on the middle position on the support plate (3), the top locking slider (16) is mounted on the piston rod of the middle ejection hydraulic cylinder (17), and the flange inner high-temperature-resistant resin gasket (15) is mounted above the top locking slider (16); the rotating hydraulic motor-and-pinion units (6) are mounted and connected on the two sides of the upper middle part of the frame, the pinions of the hydraulic motor-and-pinion units (6) are meshed with the gear wheel (7), the gear wheel (7) is mounted below the connection disc (14), the connection disc (14) is mounted on the piston of the top hydraulic cylinder (11), and the top hydraulic cylinder (11) is fixed on the frame (1); four vertical guide columns (8) on the inner side of the frame are mounted below the connection disc (14), the laser heads (9) are mounted on the horizontal guide columns (10), and the horizontal guide columns (10) are mounted on the vertical guide columns (8); and four vertical guide columns (8) on the outer side are mounted below the connection disc (14), the horizontal guide columns (10) are mounted on the vertical guide columns (8), and the grating sensors (22) are mounted on the two sides of the roller way (18).

In another aspect of the invention, a method for laser cutting of aluminum alloy wheel blank burrs using the foregoing device is provided. The method comprises the following steps: firstly the grating sensors (22) position a wheel cast part (12), the roller way (18) stops rotating, the piston of the bottom hydraulic cylinder (2) moves upwards and stops moving when approaching the lower side of the roller way (18), and the middle ejection hydraulic cylinder (17) moves upwards to eject the wheel cast part (12); and meanwhile, the four side locking hydraulic cylinders (19) move outwards to drive the side locking slider (4) and the wheel rim inner wall high-temperature-resistant resin gasket (5) to move outwards, and after the wheel rim inner wall high-temperature-resistant resin gasket (5) presses against the wheel, the side locking hydraulic cylinders (19) stop moving; the piston of the top hydraulic cylinder (11) moves downwards, the piston of the top hydraulic cylinder (11) stops moving after the gearwheel (7) is meshed with the pinions of the rotating hydraulic motor-and-pinion units (6), and the upper four laser heads are (9) just located within an upper burr cutting distance of the aluminum wheel blank (12), while the lower four laser heads (9) are located within a lower burr cutting distance; the rotating hydraulic motor-and-pinion units (6) on the two sides are rotated to start cutting; after the cutting operation is completed, the piston of the top hydraulic cylinder (11) moves upwards for resetting, with the cut burrs falling onto the discharge tray (13); the side locking hydraulic cylinders (19) move inwards for resetting, the middle ejection hydraulic cylinder (17) moves downwards for resetting, the bottom hydraulic cylinder (2) moves downwards for resetting, the aluminum wheel blank (12) falls onto the roller way (18) after being cut, and the roller way (18) operates such that the aluminum wheel blank (12) moves into the next procedure.

In order to achieve the above purpose, the technical solution adopted by the invention is as follows: an aluminum wheel burr removing device consists of a frame, a bottom hydraulic cylinder, a support plate, a side locking slider, a wheel rim inner wall high-temperature-resistant resin gasket, rotating hydraulic motor-and-pinion units, a gear wheel, vertical guide columns, laser heads, a top hydraulic cylinder, an aluminum wheel blank, a discharge tray, a connection disc, a flange inner high-temperature-resistant resin gasket, a top locking slider, a middle ejection hydraulic cylinder, a roller way, side locking hydraulic cylinders, and a bottom guide column. The bottom hydraulic cylinder is mounted below and the bottom guide column is fixed on the frame, the hydraulic cylinder piston rod is connected with the support plate, four side locking hydraulic cylinders are uniformly and circumferentially distributed above the support plate, the pistons of the locking hydraulic cylinders are connected with the side locking slider, the upright guide plates are mounted on the two sides of the side locking slider, the wheel rim inner wall high-temperature-resistant resin gasket is mounted on the side locking slider, and is in contact with the inner cavity of a wheel rim when locking, the middle ejection hydraulic cylinder is mounted on the middle position on the support plate, the top locking slider is mounted on the piston rod of the middle ejection hydraulic cylinder, and the flange inner high-temperature-resistant resin gasket is mounted above the top locking slider. The rotating hydraulic motors are mounted on the two sides of the upper middle part of the frame, the motors are connected with the pinions, the pinions are meshed with the gear wheel, the gear wheel is mounted below the connection disc, the connection disc is mounted on the piston of the top hydraulic cylinder, and the top hydraulic cylinder is fixed on the frame. Four vertical guide columns on the inner side of the frame are mounted below the connection disc, the laser heads are mounted on the horizontal guide columns, and the horizontal guide columns are mounted on the vertical guide columns. Four vertical guide columns on the outer side of the frame are mounted below the connection disc, the laser heads are obliquely mounted on the horizontal guide columns, and the horizontal guide columns are mounted on the vertical guide columns. Switches of the grating sensors are mounted on the two sides of the roller way.

During actual operation, firstly the grating sensors position a wheel cast part, the roller way stops rotating, the piston of the bottom hydraulic cylinder moves upwards and stops moving when approaching the lower side of the roller way, and the middle ejection hydraulic cylinder moves upwards to eject the wheel cast part, and meanwhile, the four side locking hydraulic cylinders move outwards to drive the side locking slider and the high-temperature-resistant resin gasket to move outwards, and after the gasket presses against the wheel, the side locking hydraulic cylinders stop moving. The piston of the top hydraulic cylinder moves downwards, the piston stops moving after the gearwheel is meshed with the pinions connected to the motors, and the upper four laser heads are just located within an upper burr cutting distance of the wheel hub, while the lower four laser heads are located within a lower burr cutting distance. The motors on the two sides are rotated to start cutting. After the cutting operation is completed, the piston of the top hydraulic cylinder is reset, with the cut burrs falling onto the discharge tray. The side locking hydraulic cylinders are reset, the middle ejection hydraulic cylinder is reset, the wheel falls onto the roller way after being cut, and the roller way operates such that the wheel leaves and waits for a next cutting cycle.

During use, the device of the present invention can realize the function of online cutting of wheel burrs, thereby improving work efficiency and reducing manual labor, and the device has the characteristics of high cutting precision, rounded and burr-free cutting parts, stable performances, high degree of automation and the like.

BRIEF DESCRIPTION OF THE DRAWINGS

The implementations of the present invention will be described below in details with reference to the accompanying drawings, in which.

Figure 1:
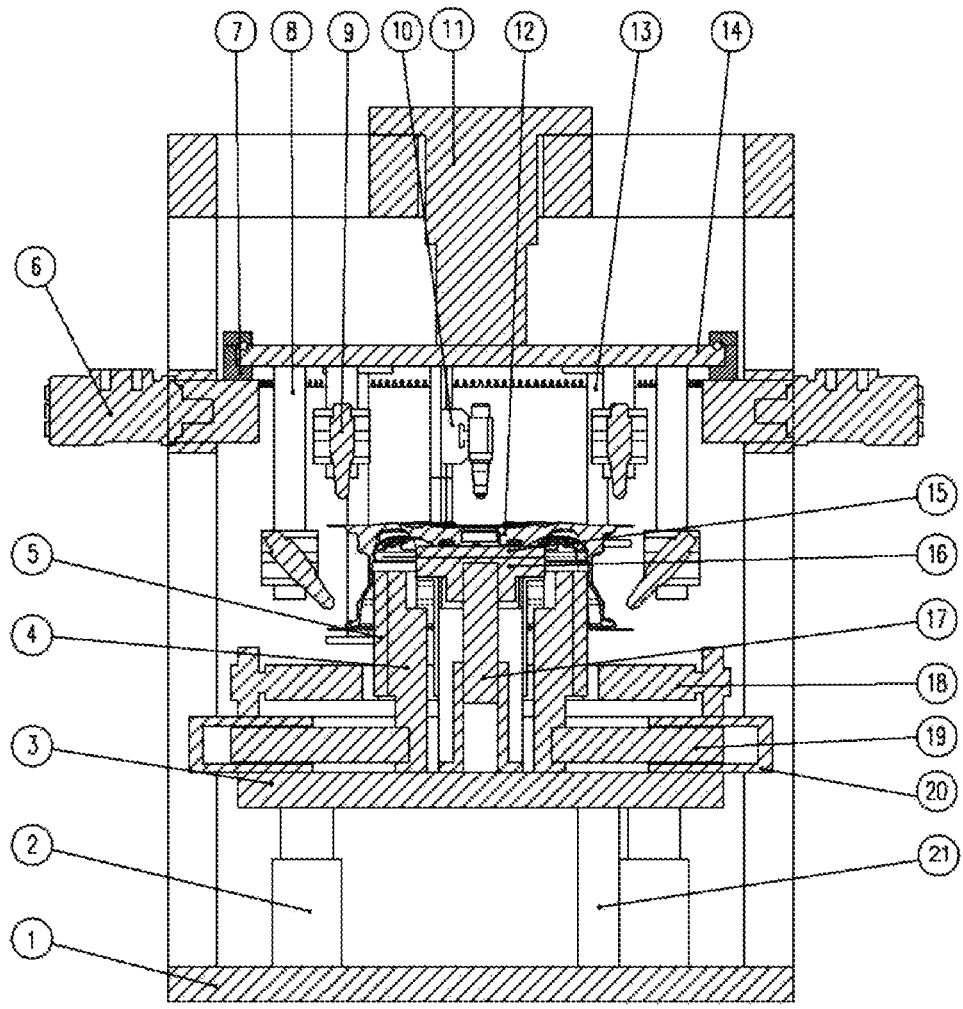
FIG. 1 is a sectional view of a laser cutting-based aluminum wheel blank deburring device of embodiment 1 of the present invention in an operating state.
Figure 2:
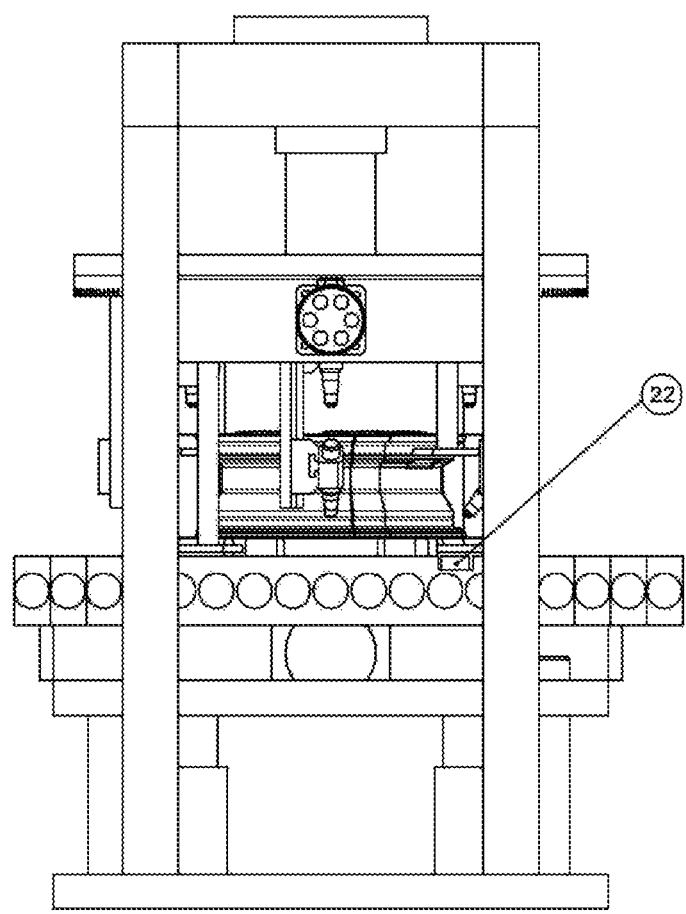
FIG. 2 is a left view of a laser cutting-based aluminum wheel blank deburring device of embodiment 1 of the present invention in an operating state.
Figure 3:
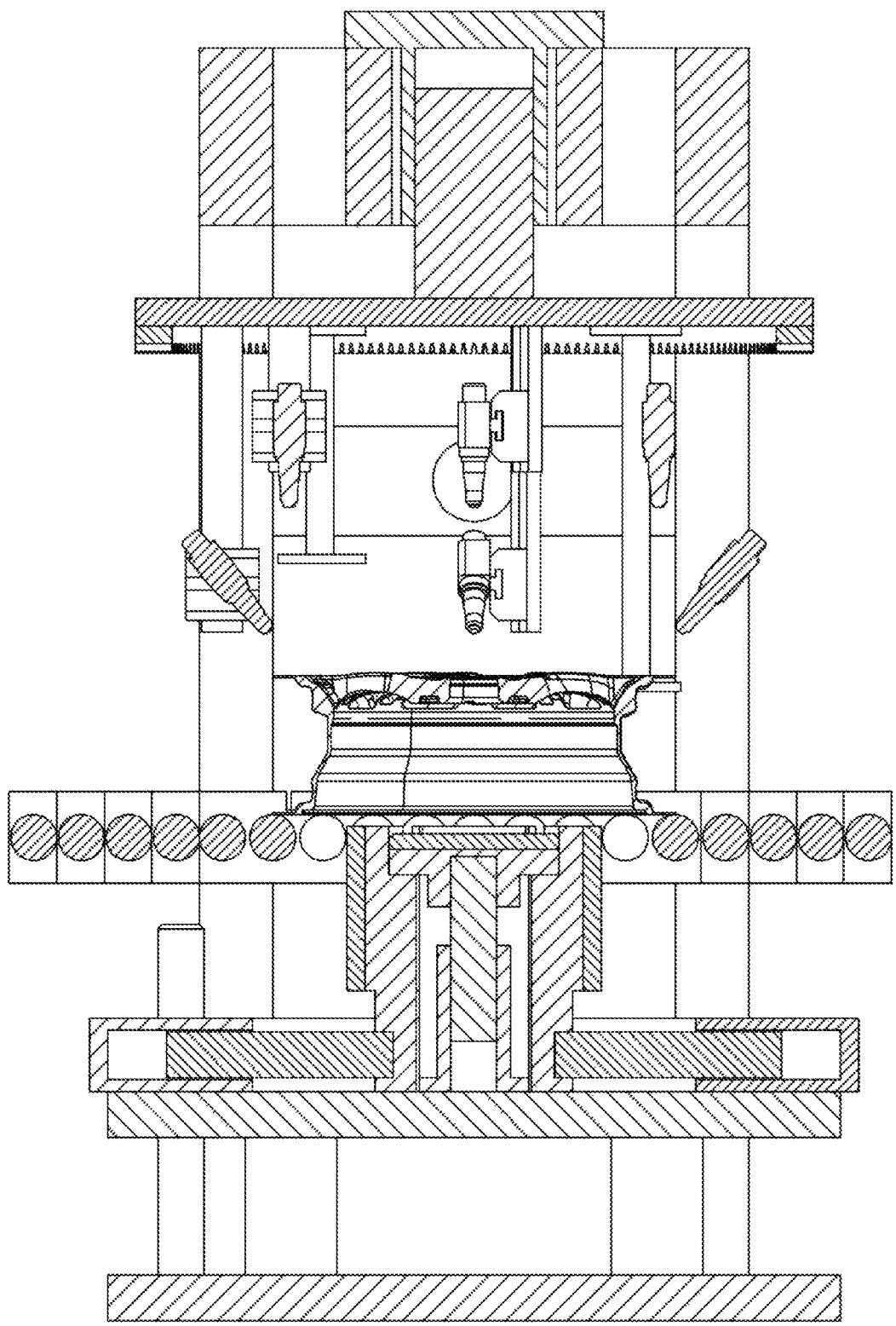
FIG. 3 is a front view of a laser cutting-based aluminum wheel blank deburring device of embodiment 1 of the present invention.

In the drawings, 1—frame, 2—bottom hydraulic cylinder, 3—support plate, 4—side locking slider, 5—wheel rim inner wall high-temperature-resistant resin gasket, 6—rotating hydraulic motor-and-pinion unit, 7—gear wheel, 8—vertical guide column, 9—laser head, 10—horizontal guide column, 11—top hydraulic cylinder, 12—aluminum wheel blank, 13—discharge tray, 14—connection disc, 15—flange inner high-temperature-resistant resin gasket, 16—top locking slider, 17—middle ejection hydraulic cylinder, 18—roller way, 19—side locking hydraulic cylinder, 20—upright guide plate, 21—bottom guide column, 22—grating sensor.

DETAILED DESCRIPTION OF THE INVENTION

Embodiment 1

The details and operation conditions of the specific device presented in accordance with the present invention will be described hereinafter with reference to the accompanying drawings.

The device consists of a frame 1, a bottom hydraulic cylinder 2, a support plate 3, a side locking slider 4, a wheel rim inner wall high-temperature-resistant resin gasket 5, rotating hydraulic motor-and-pinion units 6, a gear wheel 7, vertical guide columns 8, laser heads 9, horizontal guide columns 10, a top hydraulic cylinder 11, an aluminum wheel blank 12, an a discharge tray 13, a connection disc 14, a flange inner high-temperature-resistant resin gasket 15, a top locking slider 16, a middle ejection hydraulic cylinder 17, a roller way 18, side locking hydraulic cylinders 19, upright guide plates 20, a bottom guide column 21, and grating sensors 22.

The bottom hydraulic cylinder 2 is mounted below the device and the bottom guide column 21 is fixed above the frame 1, the hydraulic cylinder piston rod is connected with the support plate 3, four side locking hydraulic cylinders 19 are uniformly and circumferentially distributed above the support plate, the pistons of the locking hydraulic cylinders are connected with the side locking slider 4, the upright guide plates 20 are mounted on the two sides of the side locking slider, the wheel rim inner wall high-temperature-resistant resin gasket 5 is mounted on the side locking slider, and is in contact with the inner cavity of a wheel rim when locking, the middle ejection hydraulic cylinder 17 is mounted on the middle position on the support plate, the top locking slider 16 is mounted on the piston rod of the middle ejection hydraulic cylinder, and the flange inner high-temperature-resistant resin gasket 15 is mounted above the slider. The hydraulic rotating motors 6 are mounted on the two sides of the upper middle part of the frame, the motors are connected with the pinions, the pinions are meshed with the gear wheel 7, the gear wheel is mounted below the connection disc 14, the connection disc 14 is mounted on the piston of the top hydraulic cylinder 16, and the top hydraulic cylinder 16 is fixed on the frame 1. The four vertical guide columns 8 on the inner side are mounted below the connection disc 14, the laser heads 9 are mounted on the horizontal guide columns 10, and the horizontal guide columns 10 are mounted on the vertical guide columns 8. The four vertical guide columns 8 on the outer side are mounted below the connection disc 14, the laser heads 9 are obliquely mounted on the horizontal guide columns 10, the horizontal guide columns 10 are mounted on the vertical guide columns 8, and the grating sensors 22 are mounted on the two sides of the roller way 18.

During actual operation, firstly the grating sensors 22 position the wheel cast part 12, the roller way 18 stops rotating, the piston of the bottom hydraulic cylinder 2 moves upwards and stops moving when approaching the lower side of the roller way 18, the middle ejection hydraulic cylinder 17 moves upwards to eject the wheel cast part 12, and meanwhile, the four side locking hydraulic cylinders 19 move outwards to drive the side locking slider 4 and the high-temperature-resistant resin gasket 5 to move outwards, and after the gasket presses against the wheel, the side locking hydraulic cylinders 19 stop moving. The piston of the top hydraulic cylinder 11 moves downwards, the piston stops moving after the gearwheel 7 is meshed with the pinions 6 connected to the motors, and the upper four laser heads 9 are just located within an upper burr cutting distance of the aluminum wheel blank 12, while the lower four laser heads 9 are located within a lower burr cutting distance. The motors 6 on the two sides are rotated to start cutting. After the cutting operation is completed, the piston of the top hydraulic cylinder 11 moves upwards for resetting, with the cut burrs falling onto the discharge tray 13. The side locking hydraulic cylinders 19 move inwards for resetting, the middle ejection hydraulic cylinder 17 moves downwards for resetting, the bottom hydraulic cylinder 2 moves downwards for resetting, the aluminum wheel blank 12 falls onto the roller way 18 after being cut, the roller way 18 operates such that the aluminum wheel blank 12 moves into the next procedure, and the cutting device waits for the next operating cycle.

The invention claimed is:

1. A device for laser cutting of aluminum alloy wheel blank burrs, wherein the device consists of a frame (1), a bottom hydraulic cylinder (2), a support plate (3), a side locking slider (4), a wheel rim inner wall high-temperature-resistant resin gasket (5), rotating hydraulic motor-and-pinion units (6), a gear wheel (7), vertical guide columns (8), laser heads (9), horizontal guide columns (10), a top hydraulic cylinder (11), a discharge tray (13), a connection disc (14), a flange inner high-temperature-resistant resin gasket (15), a top locking slider (16), a middle ejection hydraulic cylinder (17), a roller way (18), side locking hydraulic cylinders (19), upright guide plates (20), a bottom guide column (21), and grating sensors (22), wherein the bottom hydraulic cylinder (2) and the bottom guide column (21) are fixed above the frame (1); the hydraulic cylinder piston rod of the bottom hydraulic cylinder (2) is connected with the support plate (3), four side locking hydraulic cylinders (19) are uniformly and circumferentially distributed above the support plate (3), the pistons of the locking hydraulic cylinders (19) are connected with the side locking slider (4), and the upright guide plates (20) are mounted on the two sides of the side locking slider (4); the wheel rim inner wall high-temperature-resistant resin gasket (5) is mounted on the side locking slider (4) and arranged to be in contact with the inner cavity of a wheel rim when locking; the middle ejection hydraulic cylinder (17) is mounted on the middle position on the support plate (3), the top locking slider (16) is mounted on the piston rod of the middle ejection hydraulic cylinder (17), and the flange inner high-temperature-resistant resin gasket (15) is mounted above the top locking slider (16); the rotating hydraulic motor-and-pinion units (6) are mounted and connected on the two sides of the upper middle part of the frame, the pinions of the hydraulic motor-and-pinion units (6) are meshed with the gear wheel (7), the gear wheel (7) is mounted below the connection disc (14), the connection disc (14) is mounted on the piston of the top hydraulic cylinder (11), and the top hydraulic cylinder (11) is fixed on the frame (1); four vertical guide columns (8) on the inner side of the frame are mounted below the connection disc (14), the laser heads (9) are mounted on the horizontal guide columns (10), and the horizontal guide columns (10) are mounted on the vertical guide columns (8); and four vertical guide columns (8) on the outer side are mounted below the connection disc (14), the horizontal guide columns (10) are mounted on the vertical guide columns (8), and the grating sensors (22) are mounted on the two sides of the roller way (18).

2. The device of claim 1, wherein the laser heads of the device are configured at one or more of the following positions: a wheel center position of a wheel hub to be machined, an outer wheel lip position of the wheel hub to be machined and an inner wheel lip position of the wheel hub to be machined.

* * * * *